Patented Nov. 13, 1923.

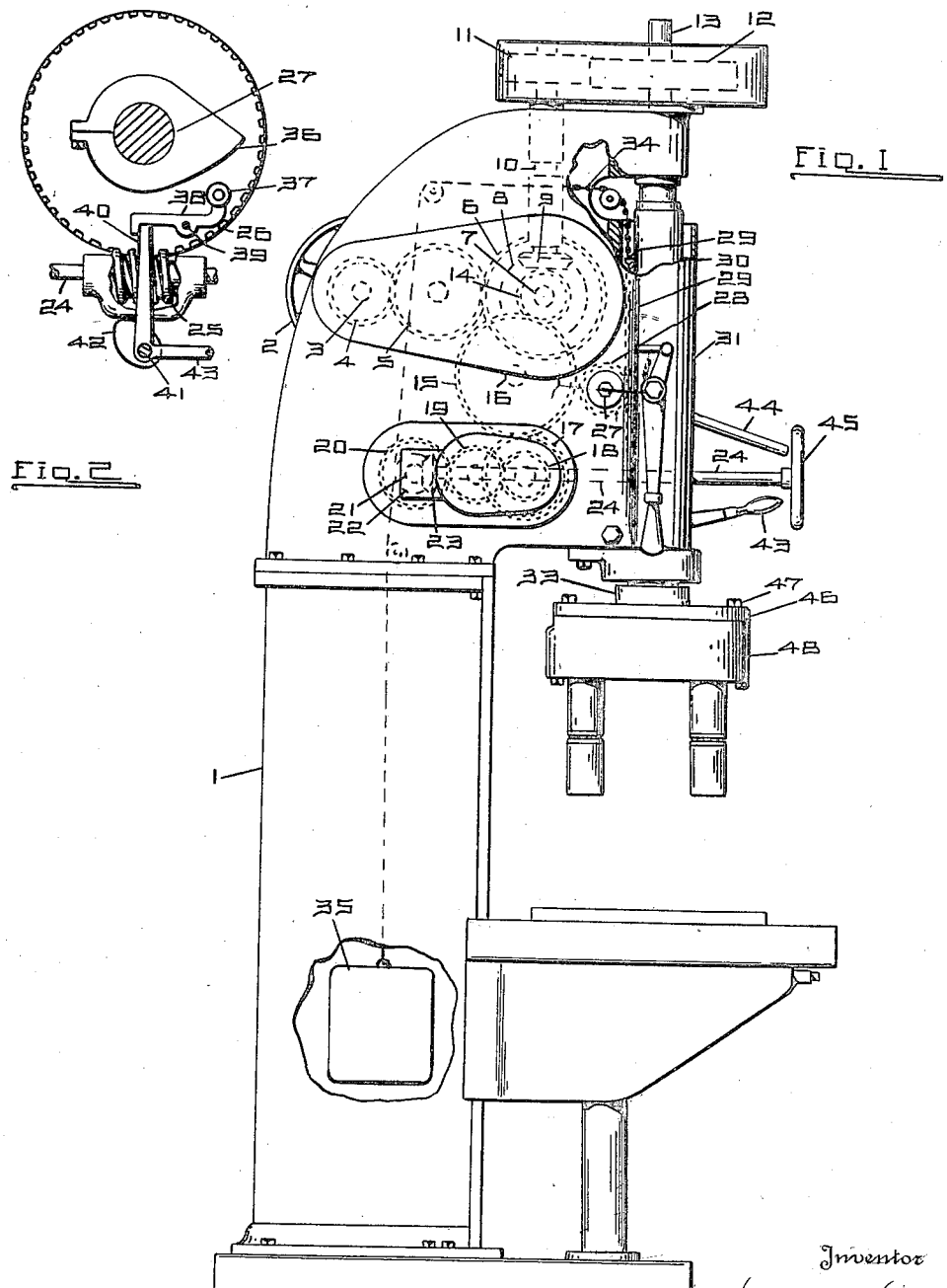

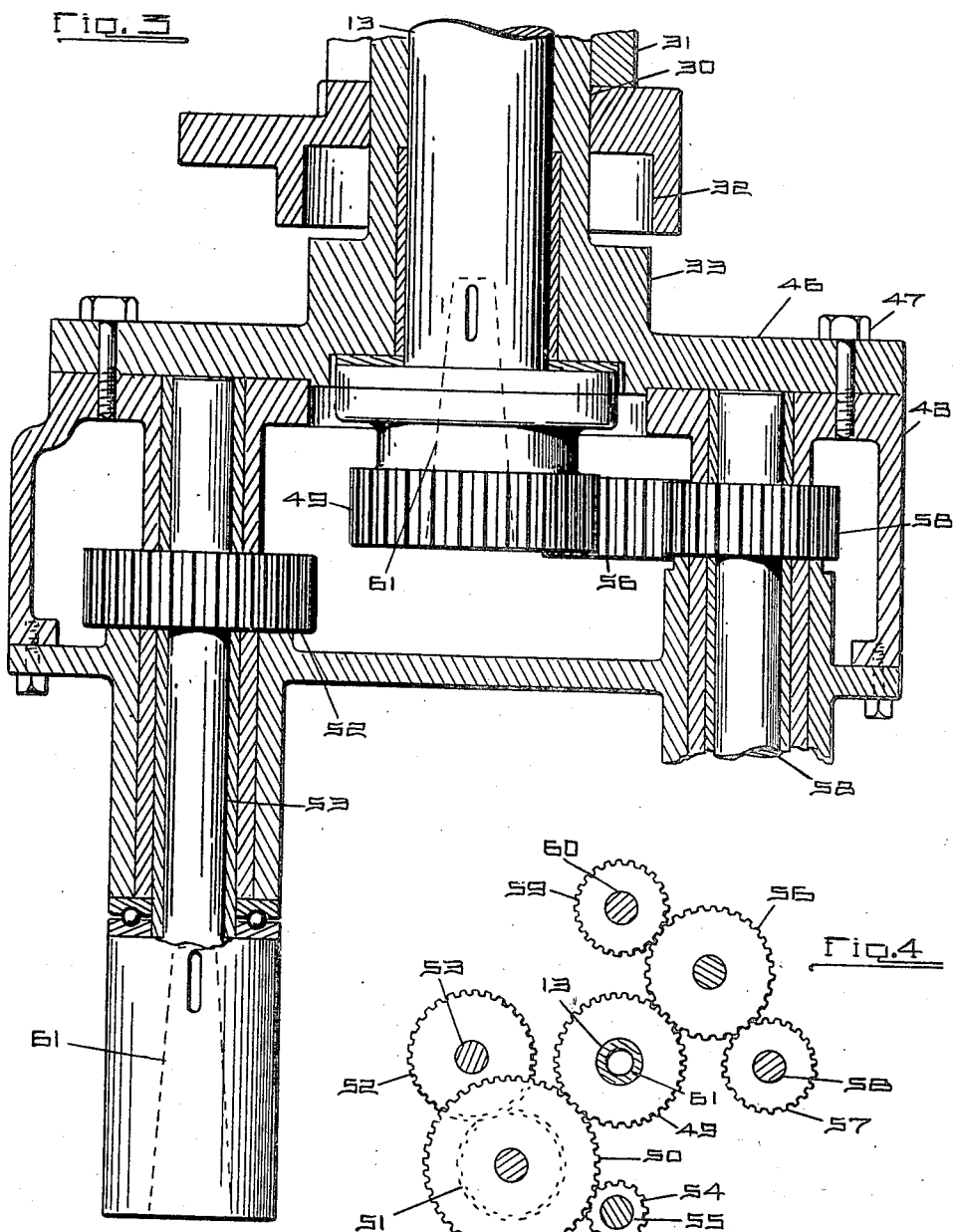

1,473,624

UNITED STATES PATENT OFFICE.

GEORGE E. HALLENBECK, OF TOLEDO, OHIO, ASSIGNOR TO BAKER BROTHERS, OF TOLEDO, OHIO, A FIRM.

MACHINE TOOL.

Application filed December 15, 1919. Serial No. 344,819.

*To all whom it may concern:*

Be it known that I, GEORGE E. HALLENBECK, a citizen of the United States of America, residing at Toledo, Lucas County, Ohio, have invented new and useful Machine Tools, of which the following is a specification.

This invention relates to features of construction in machine tools, particularly for facilitating multiple tool operation.

This invention has utility when incorporated in a drill-press multiple tool head.

Referring to the drawings:

Fig. 1 is a side elevation, with parts broken away, of an embodiment of the invention in a drill press;

Fig. 2 is a detail view of features of the trip device for permitting the quick return travel of the drill spindle;

Fig. 3 is an enlarged vertical section of the head adjacent its mounting on the drill spindle; and Fig. 4 is a top plan view of the gears of the multiple head.

The drill-press is shown as provided with a main frame 1. Driving pulley 2 on shaft 3 therein carries gear 4 in mesh with gear 5. This gear 5 is in mesh with a gear 6 on shaft 7 having fast therewith bevel gear 8 in mesh with bevel pinion 9 on vertical shaft 10 having near its upper end a pinion 11 in mesh with a gear 12 splined on vertical shaft or drill spindle 13.

Also fast with shaft 7 is pinion 14 in mesh with gear 15 on shaft 16. This gear 15 is in mesh with gear 17 having fast therewith gear 18 in mesh with gear 19. The gear 19 is in mesh with a gear 20 on shaft 21. This shaft 21 also has fast therewith a bevel gear 22 in mesh with bevel pinion 23 on shaft 24. This shaft 24 carries worm 25, Fig. 2, in mesh with worm wheel 26 on shaft 27. This shaft 27 carries pinion 28 in mesh with rack 29 in sleeve 30, reciprocable in the fixed sleeve 31 and enveloping the drive spindle 13. Accordingly, the drive spindle 13 is rotated by the gearing through shaft 10 and is fed or reciprocated by the gearing through shaft 27 and the rack and pinion.

This frame bearing 31 for the sleeve 30 has near its lower end an extension providing a recess 32 (Fig. 3) which is the cylinder of a dash-pot wherein the shoulder 33 on the sleeve 30 is the piston. Connected to this rack sleeve 30 on the upper portion is a chain 34 extending over guide pulleys in the frame 1 to carry counterweight 35. When the downward feeding of the spindle 13 approaches the region of limit of downward travel, cam 36 on shaft 27 engages roller 37 on lever 38 mounted on fixed fulcrum 39 to tilt said lever 38, thereby freeing trigger 40 pivoted on bearing 41 in the frame 1 so that holding latch 42 is moved to one side by the weight of the shaft 24, thereby dropping the worm 25 away from worm wheel 26 stopping the feed downward on the spindle 13. The driving shaft 27 is thereby freed and the counterweight 35 may become effective in pulling the sleeve 30 upward together with the drive head mounted thereon. Near the upper limit of travel the shoulder or piston 33 on the driving head of the sleeve 30 enters the recess 32 and there is a dash-pot or cushioning action avoiding concussion in the limit of upward travel of this drive head as actuated by the counterweight 35. The feed driving device may be reset by handle 43. The more delicate adjustment of the feed manually may be effected by hand wheel 45, while the more rapid wider ranges of adjustment may be effected by handles 44 on the shaft 27.

The lower end of the non-rotatable rack carrying sleeve 36 is provided with an integral flange 46 upon which may be mounted by bolts 47 the multiple head housing 48. Centrally in this housing 48 and mounted on the spindle 13 is driving gear 49. Outward from this main driving gear 49 in the head 48 is intermediate gear 50 in mesh with the gear 49. Fixed with this gear 50 is pinion 51 in mesh with pinion 52 on shaft 53 carrying a tool head.

In the type of multiple head herein shown, it is designed for carrying four working tools, and to this end there is a second intermediate gear in mesh with the main gear 49. This second gear 56 in mesh with the gear 49 has in mesh therewith a pinion 57 on a driving stem 58 for a tool. Also in mesh with the intermediate gear 56 is a second gear 59 carrying a tool shaft 60.

In the structure of multiple head as herein shown, the drill press may have the head 48 removed, and in the socket 61 of the main drill spindle 13, a single tool may be inserted. When it is desired to use this same press in the same direction of rotative driving travel, the head 48 may be attached with the desired number of working tools in such angular arrangement as may be preferred, and in the socket 61 of these multiple spindle tools of the various types desired may be inserted for carrying out successively or simultaneously the various operations in a simplified structure susceptible of a wide range of usefulness.

What is claimed and it is desired to secure by Letters Patent is:

1. A drill press embodying a rotary drill spindle, a frame providing a bearing, and a sleeve reciprocable in said bearing and in which sleeve the spindle is rotatable, said frame being provided with an annular recess open in a plane radial of the spindle, and said sleeve being provided with a shoulder for entering said recess for coacting in sleeve reciprocation to cushion the sleeve adjacent a limit of travel thereof.

2. A drill press embodying a reciprocable sleeve, a frame providing a bearing for the sleeve, and a spindle rotatable in the sleeve, said frame and sleeve provided with means forming piston and cylinder elements concentric of the spindle coacting as a dashpot.

3. A drill press embodying a reciprocable sleeve, a frame providing a bearing for the sleeve, and a spindle rotatable in the sleeve, said sleeve having a terminal integral flange shouldered to provide a piston concentric with the spindle, and said frame providing a recess for the reception of said shoulder near a limit of reciprocation travel of the spindle and sleeve.

4. A drill press embodying a reciprocable sleeve, a frame providing a bearing for the sleeve, a spindle rotatable in the sleeve, said sleeve providing as a unitary structure a terminal integral flange, concentric therewith, said flange having dashpot coaction with the frame, and on the opposite side from said flange having concentrically mounted thereon a multiple tool head.

5. A drill press embodying a reciprocable sleeve, a frame providing a bearing for the sleeve, a spindle rotatable in the sleeve, said sleeve having a terminal flange integral therewith, a gear carried by the spindle, and a multiple tool head mounted on the flange and independent of the spindle, said head including intermediate gears in mesh with the spindle gear, and auxiliary spindles provided with gears driven from the intermediate gears, said head carried spindles and gears being centered by said flange independently of the sleeved spindle for being held as to driving torque by said sleeve.

In witness whereof I affix my signature.

GEO. E. HALLENBECK.